United States Patent [19]

Torii et al.

[11] Patent Number: 4,972,735
[45] Date of Patent: Nov. 27, 1990

[54] WRIST ASSEMBLY FOR AN INDUSTRIAL ROBOT

[75] Inventors: Nobutoshi Torii, Hachioji; Hitoshi Mizuno; Kyoji Iwasaki, both of Hino, all of Japan

[73] Assignee: Fanuc Ltd., Yamanashi, Japan

[21] Appl. No.: 356,658

[22] PCT Filed: Jun. 9, 1987

[86] PCT No.: PCT/JP87/00360

§ 371 Date: Jan. 25, 1988

§ 102(e) Date: Jan. 25, 1988

[87] PCT Pub. No.: WO87/07555

PCT Pub. Date: Dec. 17, 1987

Related U.S. Application Data

[63] Continuation of Ser. No. 150,424, Jan. 25, 1988, abandoned.

[30] Foreign Application Priority Data

Jun. 9, 1986 [JP] Japan .................. 61-131748

[51] Int. Cl.[5] .............................. F16H 37/06
[52] U.S. Cl. ..................... 74/665 M; 901/29
[58] Field of Search ........... 74/665 L, 665 M, 409, 74/416, 417, 423; 901/23, 25, 26, 29

[56] References Cited

U.S. PATENT DOCUMENTS

| 3,748,031 | 1/1974 | Niitu et al. | 901/18 X |
| 3,901,098 | 8/1975 | Jinkins | 74/423 X |
| 3,906,323 | 9/1975 | Ono et al. | 901/29 X |
| 4,036,076 | 7/1977 | Anderson | 74/409 |
| 4,149,278 | 4/1979 | Wiker et al. | 901/29 X |
| 4,246,661 | 1/1981 | Pinson | 901/25 X |
| 4,282,765 | 8/1981 | Ashaver et al. | 74/409 X |
| 4,376,401 | 3/1983 | Borzym | 74/409 X |
| 4,507,046 | 3/1985 | Sugimoto et al. | 901/29 X |
| 4,557,657 | 12/1985 | Olson et al. | 901/29 X |
| 4,576,544 | 3/1986 | Passemard et al. | 901/29 X |
| 4,586,868 | 5/1986 | Nakashima et al. | 901/29 X |
| 4,642,021 | 2/1987 | Kikuchi | 901/25 X |
| 4,688,984 | 8/1987 | Nakashima et al. | 901/29 X |
| 4,733,578 | 3/1988 | Glaze et al. | 74/713 |
| 4,776,232 | 10/1988 | Beyer | 74/665 M X |

FOREIGN PATENT DOCUMENTS

| 18554 | 10/1961 | Japan . |
| 177291 | 10/1983 | Japan . |
| 53176 | 3/1984 | Japan . |

OTHER PUBLICATIONS

Dudley, D. W., Handbook of Practical Gear Design, N.Y., McGraw-Hill Book Co., 1984, pp. 1.38–1.40.
Gear Handbook, 1st ed. New York, McGraw-Hill Book Co., 1962, pp. 2–12.
Bryant, R. C. and D. W. Dudley, "Which Right-Angle Gear System?", Product Engineering (Nov. 7, 1960), pp.55–65.

Primary Examiner—Dwight G. Diehl
Attorney, Agent, or Firm—Armstrong, Nikaido, Marmelstein, Kubovcik & Murray

[57] ABSTRACT

The wrist assembly of an industrial robot comprises a first wrist portion (21) provided on the free end of the robot arm (20) and having a pair of projections (22, 23) in parallel with each other on the fore-end thereof. A second wrist portion (24) is provided between the projections of the first wrist portion and supported on both of the projections so as to be rotatable about a first axis ($\beta$) intersecting a longitudinal axis of the robot arm at a right angle. A third wrist portion (25) is supported on the second wrist portion so as to be rotatable about a second axis ($\alpha$) intersecting the first axis at a right angle, and constructed to allow work attachments to be attached to the front end thereof. A first motor (45) and a second motor (55) are used for driving the second wrist portion and the third wrist portion. A first power transmission mechanism (I) for transmitting a driving force of the first motor to the second wrist portion includes a pair of first hypoid gears (35, 36) provided in one of the projection of the first wrist portion and meshed with each other. A second transmission mechanism (II) for transmitting a driving force of the second motor to the third wrist portion includes a pair of second hypoid gears (51, 52) provided in the other projection of the first wrist portion and meshed with each other.

2 Claims, 4 Drawing Sheets

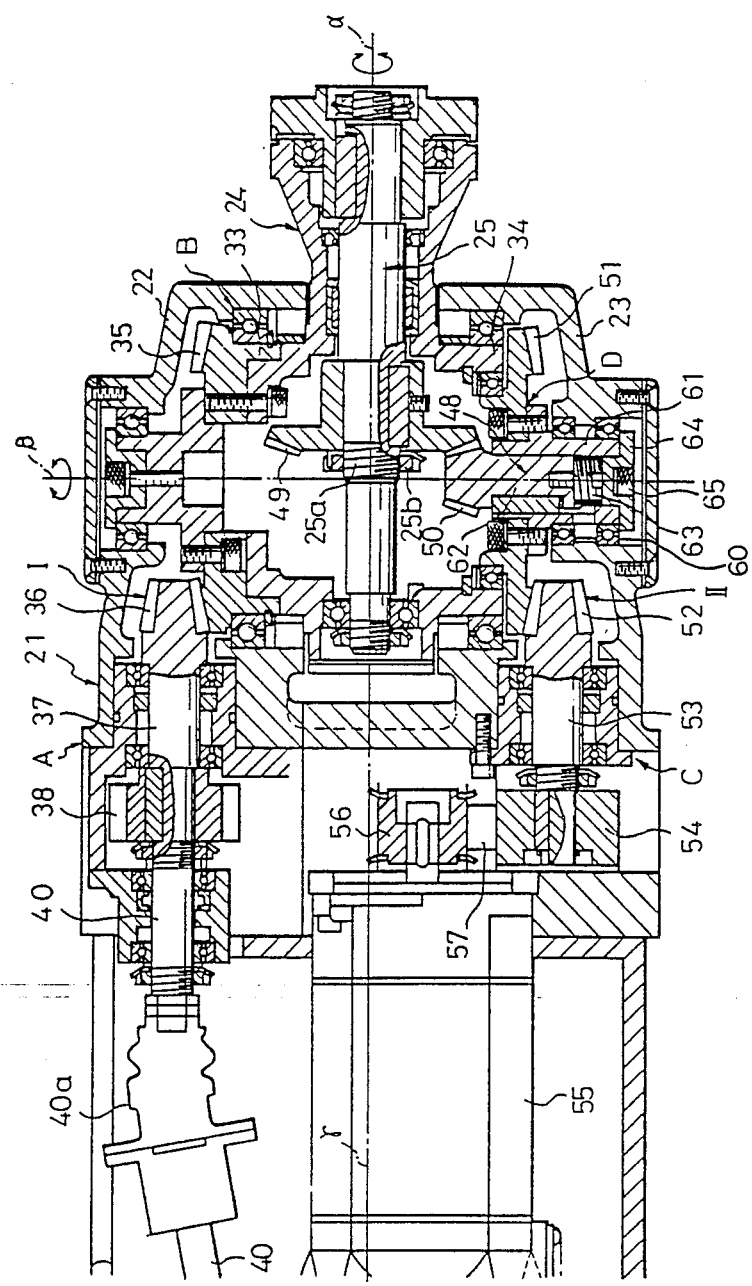

WRIST ASSEMBLY FOR AN INDUSTRIAL ROBOT

This application is a continuation of application Ser. No. 150,424 filed Jan. 25, 1988, now abandoned.

TECHNICAL FIELD

The present invention relates to a wrist assembly for an industrial robot, and more particularly to an improved wrist assembly comprising a first wrist portion provided on the free end of the robot arm and having a pair of projections in parallel with each other on the fore-end thereof, a second wrist portion disposed between the projections of the first wrist portion and supported on both of the projections so as to be rotatable about a first axis intersecting the longitudinal axis of the robot arm at right angles, a third wrist portion supported on the second wrist portion so as to be rotatable about a second axis intersecting the first axis at a right angle and constructed to allow work attachments to be secured thereto, and a motor for driving the second wrist portion and the third wrist portion through a power transmission mechanism.

BACKGROUND ART

In the past, generally a wrist assembly of an industrial robot has been provided with a first wrist portion secured to the free end of the robot arm so as to be rotatable about the longitudinal axis of the robot arm, or immovably fixed thereto. A second wrist portion is provided between a pair of projections formed at the fore-end of the first wrist portion, and supported on both of the projections of the first wrist portion so as to be rotatable about a first axis perpendicular to the longitudinal axis of the robot arm. A third wrist portion, constructed to allow work attachments such as robot hands and so forth to be secured thereto, is supported on the second wrist portion so as to be rotatable about a second axis perpendicular to the first axis. The second wrist portion and the third wrist portion are driven by electric motors connected thereto through power transmission mechanisms. Generally, it is necessary to carry out the reduction needed through power transmission mechanisms in such a manner that the ratio of the number of rotation of each wrist portion to the number of output shafts of motors may be the predetermined reduction gear ratio.

In the conventional aforementioned wrist assembly, the power transmission mechanism for the second wrist portion is provided with a pair of bevel gears disposed in one projection of the first wrist portion, and the power transmission mechanism for the third wrist portion is provided with a pair of bevel gears disposed in the other projection of the first wrist portion and a pair of bevel gears disposed in the second wrist portion.

However, generally the reduction gear ratio obtained through a bevel gear is limited to about ½, and therefore, it is necessary to reduce a rotative power of the motor by a further increase in the number of steps or to incorporate a reduction gear, used exclusively for reduction, with gears incorporated therein, in order to obtain a desired reduction gear ratio by the above-mentioned power transmission mechanism. However, this leads to an increase in the weight of the wrist assembly and an increase in the number of parts.

DISCLOSURE OF THE INVENTION

It is an object of the present invention to provide an improved wrist assembly capable of obtaining a desired reduction gear ratio while decreasing the number of gears needed for transmitting power from the motor to the second wrist portion and the third wrist portion.

The present invention provides a wrist assembly for an industrial robot, comprising: a first wrist portion provided on the free end of a robot arm and having a pair of projections in parallel with each other on the fore-end thereof;

a second wrist portion provided between the projections and supported on both projections so as to be rotatable about a first axis intersecting the longitudinal axis of the robot arm at right angles;

a third wrist portion supported on the second wrist portion so as to be rotatable about a second axis intersecting the first axis at right angles and constructed to allow work attachments to be secured to the front end thereof;

a first motor for driving the second wrist portion;

a second motor for driving the third wrist portion;

a first power transmission means including a pair of first hypoid gears provided in one projection of said first wrist portion and meshed with each other to transmit a driving force of said first motor to said second wrist portion; and a second power transmission means including a pair of second hypoid gears provided in the other projection of said first wrist portion and meshed with each other to transmit a driving force of said second motor to said third wrist portion.

In the wrist assembly of an industrial robot according to the present invention, a high reduction gear ratio up to around 1/10 can be obtained by a hypoid gear, and therefore, a desired reduction gear ratio can be obtained while a driving force of the motor is transmitted through a small number of gears to the second wrist portion and the third wrist portion. Also, since hypoid gears mesh more smoothly than bevel gears, mechanical vibration and noise can be reduced.

These and other objects and features of the present invention will become more readily apparent in the following detailed description of a preferred embodiment of the invention in light of the accompanying drawings.

BRIEF DESCRIPTION OF THE DRAWINGS

FIG. 4 is a partial sectional detailed plan view of the wrist as shown in FIG. 2;

BEST MODE FOR CARRYING OUT THE INVENTION

Figure 1:
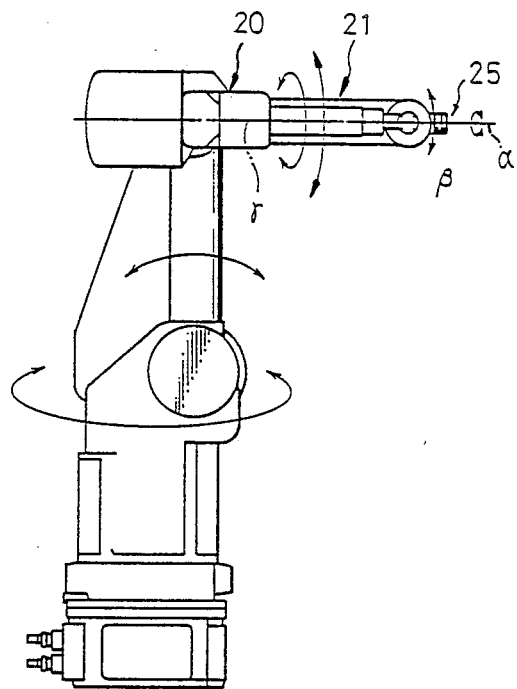
FIG. 1 is a side view of a robot with a wrist assembly according to the present invention.
Figure 2:
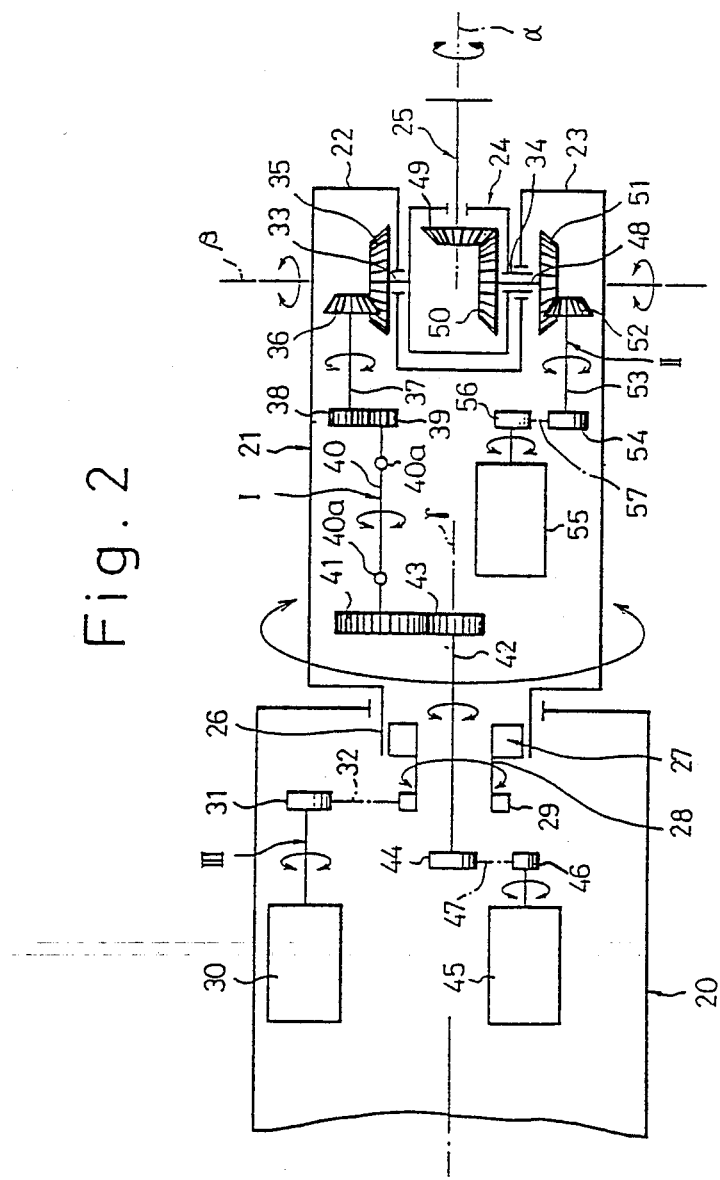
FIG. 2 is a diagrammatic view of an embodiment of a wrist assembly of, an industrial robot of the present invention.

FIGS. 1 to 5 show an embodiment of the present invention. Referring first to FIGS. 1 and 2, a first wrist portion 21 of a wrist assembly is provided at the free end of an arm 20 of an industrial robot so as to be rotatable about a longitudinal axis γ, and a hollow shaft 26 is fixed to the rear end of the first wrist portion. A second wrist portion 24 is provided between a pair of projections 22, 23 parallel to each other provided at the free end of the first wrist portion 21, so as to be rotatable about a first axis β intersecting the axis γ at a right angle. A third wrist portion, i.e., an output shaft 25, is supported on the second wrist portion 24 so as to be rotatable about a second axis α intersecting the first axis β at a right angle. A free end of the third wrist portion 25 is such that work attachments (not shown) such as a robot hand and the like may be secured thereto.

As shown in FIG. 2, the wrist assembly is provided with a first motor 45 for driving the second wrist portion 24, a second motor 55 for driving the third wrist portion 25, and a third motor 30 for driving the first wrist portion 21.

The second wrist portion 24 is connected to the first motor 45 through a first power transmission mechanism I. The third wrist portion 25 is connected to the second motor 55 through a second power transmission mechanism II. The first wrist portion 21 is connected to the third motor 30 through a third power transmission mechanism III.

The third power transmission mechanism III is provided with a hollow reduction gear 27, called a Harmonic Drive, which is fixed in the hollow shaft 26 at the rear end of the first wrist portion 21. A gear 29 is attached to a hollow shaft 28 connected to the input side of the reduction gear 27, and a gear 31 is attached to an output shaft of the third motor 30 provided in the arm 20. Both gears 29, 31 are connected by a timing belt 32. Consequently, a rotative power of the third motor 30 is transmitted to the shaft 28 through the timing belt 32, and then transmitted to the first wrist portion 21, while the number of revolutions thereof are reduced by the reduction gear 27.

With reference to FIGS. 2 and 4, the second wrist portion 24 is provided with shaft portions 33, 34 on both side walls thereof, and these shaft portions 33, 34 are rotatably supported by the projections 22, 23 respectively of the first wrist portion 21.

The first power transmission mechanism I for transmitting the driving force of the first motor 45 to the second wrist portion 24 is provided with a pair of first hypoid gears 35, 36, which are provided within one of the projections 22 of the first wrist portion 21 and which mesh with each other. One of the first hypoid gears 35 is fixed to the shaft portion 33 of the second wrist portion 24, and the other first hypoid gear 36 is fixed to one end of a shaft 37 rotatably supported within the first wrist portion 21. As seen in FIGS. 2 and 3, the shaft 37 is arranged parallel to the longitudinal axis γ of the robot arm 20, which is neither perpendicular nor parallel with respect to the first axis β. A gear 38 is fixed to the other end of the shaft 37, a gear 39, which meshes with the gear 38, is fixed to one end of a shaft 40 rotatably supported in the first wrist portion 21, and a gear 41 is fixed to the other end of the shaft 40. Further, two pairs of ball joints 40a are incorporated into the shaft 40.

A shaft 42 is provided coaxially and rotatably within the hollow shaft 28, and the gear 41 meshes with a gear 43 fixed to one end of the shaft 42 within the first wrist portion 21. A gear 44 fixed to the shaft 42 and a gear 46 fixed to the output shaft of the first motor 45 are provided within the arm 20, and both gears 44, 46 are connected by a timing belt 47. Consequently, a rotative power of the first motor 45 is transmitted to the first hypoid gears 36, 35 through the timing belt 47 and the two pairs of gears, and then transmitted to the second wrist portion 24. It is not necessary to provide a special reduction gear in the power transmitting path between the first motor 45 and the second wrist portion 24, since a high reduction gear ratio can be obtained by using the first hypoid gears 35, 36.

Examples of the reduction gear ratio in power transmitting system to the second wrist portion 24 are shown as follows. The reduction gear ratio of the gears 46, 44 is about 1/1.4, and the reduction gear ratio of the gears 43, 41 is about 1/1.9, and the reduction gear ratio of the gears 39, 38 is about 1/2.8, and the reduction gear ratio of the gears 36, 35 is about ⅛.

A second power transmission mechanism II includes a pair of second hypoid gears 51, 52 which are provided in the other projection of the first wrist portion 21 and which mesh each other, and a pair of bevel gears 49, 50 which are provided in the second wrist portion 24 and which mesh with each other. One of the bevel gears 49 is fixed to the third wrist portion 25, and the other bevel gear 50 is extended through the shaft portion 34 of the second wrist portion 24 and connected to a shaft 48 which is rotatable about the axis β.

One of the second hypoid gears 51 is connected to the shaft 48 and is rotatable about the axis β, and the other second hypoid gear 52 is fixed to one end of a shaft 53 which is rotatably supported in the first wrist portion 21.

Figures 3A, 3B:
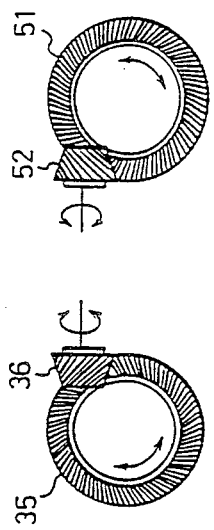
FIGS. 3(a) and 3(b) are side views of hypoid gears used in assembly shown in FIG. 2.

A gear 54 is fixed to the other end of the shaft 53. As seen in FIGS. 2 and 3(b), the shaft 53 is arranged parallel to the longitudinal axis γ of the robot arm 20, and is neither perpendicular nor parallel with respect to the first axis β. A gear 56 is fixed to an output shaft of the second motor 55 provided in the first wrist portion 21. Both gears 54, 56 are connected by a timing belt 57. Accordingly, a rotative power of the second motor 55 is transmitted to the hypoid gears 51, 52 through the timing belt 57, and then transmitted to the third wrist portion 25 through the bevel gears 49, 50. It is not necessary to provide a special reduction gear in the power transmitting path between the second motor 55 and the third wrist portion 25, since a high reduction gear ratio can be obtained by using the second hypoid gears 51, 52.

Additionally, the following is an example of a reduction gear ratio in the power transmitting system for the third wrist portion 25. The reduction gear ratio of the gears 56, 54 is about 1/1.4, the ratio of the gears 52, 51 is about ⅛, and the ratio of the gears 50, 49 is about 1/3.3.

Referring now to FIG. 4, in the wrist assembly of the industrial robot including the above-mentioned constitution, in order to be able to adjust the tooth contact between the hypoid gear 36 and the hypoid gear 35, a predetermined number of shims can be interposed at the point marked A in the drawing; that is, the position of the hypoid gear 36 in the axial direction of the shaft 37 with respect to the second wrist portion 24 can be adjusted by changing the number of shims. Also, a predetermined number of shims can be interposed at the point marked B, to adjust backlash between the hypoid gears 35, 36; and that is, the position of the hypoid gear 35, in a direction of the axis β with respect to the second wrist portion 24 can be adjusted by changing the number of shims.

Further, a predetermined number of shims can be interposed at the point marked C in FIG. 4 to adjust the tooth contact between the hypoid gear 52 and the hypoid gear 51; that is, the position of the hypoid gear 52 in an axial direction of the shaft 53 with respect to the second wrist portion 24 can be adjusted by changing the number of shims. Also, a predetermined number of shims can be interposed at the point marked D in the drawing, to adjust backlash between the hypoid gears 51, 52; that is, the position of the hypoid gear 51 in the direction of the axis β with respect to the second wrist portion 24 can be adjusted by changing the number of shims.

Figure 5:
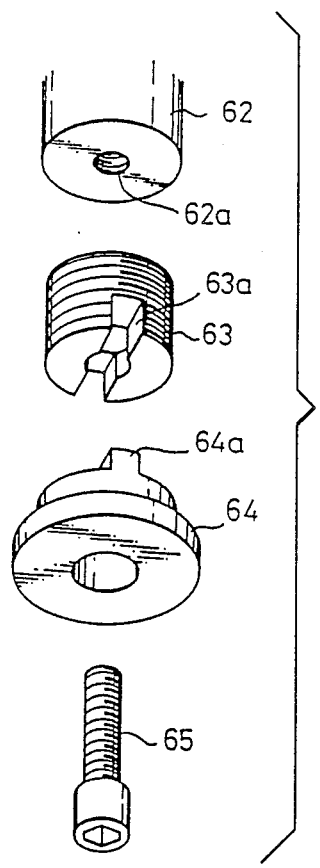
FIG. 5 is an exploded perspective view of a gear position adjusting mechanism of the wrist assembly shown in FIG. 4.

To make it possible to adjust the tooth contact between the bevel gear 50 and the bevel gear 49, the bevel gear 50 is connected in such a manner that the position thereof in a direction of the axis β with respect to the hypoid gear 51 can be adjusted. As described in more detail hereinbelow, the shaft 48, as seen in FIGS. 4 and 5, is provided with a hollow cylindrical shaft portion 61 supported in the projection 23 of the first wrist portion 21 so as to be rotatable in bearings 60, and a central shaft portion 62 is inserted in the hollow cylindrical shaft portion 61. The central shaft portion 62 is movable only in the longitudinal direction, by a key within the hollow cylindrical shaft portion 61, and the hypoid gear 51 is secured to the hollow cylindrical shaft portion 61. The bevel gear 50 is integrally formed at the internal end of the central shaft portion 62, and a threaded hole 62a is formed at the external end of the central shaft portion 62. A thread groove is formed on the inner surface at the external end of the hollow cylindrical shaft 61, and a position adjusting ring 63 having an outer peripheral threaded groove is screw-engaged in the hollow cylindrical shaft portion 61. An end plate 64 is fitted in the external end of the hollow cylindrical shaft portion 61, whereby a protrusion 64a formed on the internal end of the end plate 64 is engaged in a radial channel 63a formed on the external end of the ring 63, and then a bolt 65 extending through the end plate 64 and the position adjusting ring 63 is screw-engaged in the threaded hole 62a of the central shaft portion 62.

The position of the ring 63 can be adjusted in the axial direction inside the hollow cylindrical shaft portion 61 by rotating the end plate 64 having the protrusion 64a engaged with the channel 63a of the ring 63. The central shaft portion 62 is pressed against the ring 63 by fastening the bolt 65, and then locked in the axial direction. Namely, the position of the central shaft portion 62 and the bevel gear 50 can be adjusted by adjusting the position of the ring 63 inside the hollow cylindrical shaft portion 61.

To adjust backlash between the bevel gears 50, 49, the position of the third wrist portion 25 can be adjusted in the direction of the axis α with respect to the second wrist portion 24 by threaded portions 25a on both sides of the third wrist portion 25 and nuts 25b screw-engaged with these threaded portions 25a.

With the above-mentioned arrangement, backlash and the tooth contact between each set of gears can be readily adjusted.

Although the present invention has been described and shown as above, many modifications thereto may be made within the scope of the invention, which is not limited to the preferred embodiment. For example, the first wrist portion may be fixed to the fore-end of the robot arm. Also, modifications can be made to the arrangement of the motors, power transmission means between motor and hypoid gear, and so forth.

CAPABILITY OF EXPLOITATION IN INDUSTRY

From the foregoing, according to the present invention, it can be seen that a high reduction gear ratio of 1/10 can be obtained by using the hypoid gears which are incorporated in the power transmission paths for the second and the third wrist portion. Accordingly, a wrist assembly of an industrial robot can be provided in which a predetermined reduction gear ratio can be obtained by transmitting rotative power to the second wrist portion and the third wrist portion through a smaller number of gears. Furthermore, the invention provides a wrist assembly of an industrial robot with reduced noise and lowered mechanical vibration, due to the remarkable smoothness of the meshing of hypoid gears in comparison with bevel gears.

We claim:

1. A wrist assembly for an industrial robot, comprising:
    a first wrist portion supported on the free end of a robot arm and having a pair of projections in parallel with each other on a fore-end thereof;
    a second wrist portion provided between said projections and supported on both projections so as to be rotatable about a first axis intersecting a longitudinal axis of the robot arm at a right angle;
    a third wrist portion supported on the second wrist portion so as to be rotatable about a second axis intersecting the first axis at a right angle and constructed to allow work attachments to be secured to the front end thereof;
    said first wrist portion being rotatably supported by a hollow shaft secured to a base end of said first wrist portion for rotation about said longitudinal axis of said robot arm;
    a first motor for driving the second wrist portion;
    a second motor mounted internally of said first wrist portion for driving the third wrist portion;
    a third motor secured to said robot arm for driving said first wrist portion;
    a first power transmission means including a pair of spur gears meshing with each other and a pair of first hypoid gears provided in one projection of said first wrist portion and meshed with each other so as to transmit a driving force of said first motor to said second wrist portion;
    one of said first hypoid gears being rotatable together with said second wrist portion about said first axis, the other first hypoid gear being rotatable about a third axis which does not intersect said first axis at a right angle and which is parallel to said longitudinal axis of said robot arm, said third axis being offset to one side relative to said first axis;
    one of said spur gears is rotatable together with said other first hypoid gear about said third axis, the other spur gear is rotatable about an axis offset to a side of said first axis opposite to said third axis;
    a second power transmission means including a pair of second hypoid gears provided in the other projection of said first wrist portion and meshed with each other so as to transmit a driving force of said second motor to said third wrist portion; and
    a third power transmission means including a hollow reduction gear secured internally of said hollow shaft for transmitting a driving force of said third motor to said first wrist portion.

2. A wrist assembly for an industrial robot, comprising:
- a first wrist portion supported on the free end of a robot arm and having a pair of projections in parallel with each other on a fore-end thereof;
- a second wrist portion provided between said projections and supported on both projections so as to be rotatable about a first axis intersecting a longitudinal axis of the robot arm at a right angle;
- a third wrist portion supported on the second wrist portion so as to be rotatable about a second axis intersecting the first axis at a right angle and constructed to allow work attachments to be secured to the front end thereof;
- said first wrist portion being rotatably supported by a hollow shaft secured to a base end of said first wrist portion for rotation about said longitudinal axis of said robot arm;
- a first motor secured in said robot arm for driving the second wrist portion;
- a second motor for driving the third wrist portion;
- a third motor secured to said robot arm for driving said first wrist portion;
- a first power transmission means including a power transmission shaft, a pair of spur gears meshing with each other and a pair of first hypoid gears provided in one projection of said first wrist portion and meshed with each other so as to transmit a driving force of said first motor to said second wrist portion;
- one of said first hypoid gears being rotatable together with said second wrist portion about said first axis, the other first hypoid gear being rotatable about a third axis which does not intersect said first axis at a right angle and which is offset from and parallel to said longitudinal axis of said robot arm, said third axis being offset to one side relative to said first axis;
- one of said spur gears is rotatable together with said other first hypoid gear about said third axis by flexible driving joint connections with said power transmission shaft, the other spur gear is rotatable about an axis offset to a side of said first axis opposite to said third axis;
- a second power transmission means including a pair of second hypoid gears provided in the other projection of said first wrist portion and meshed with each other so as to transmit a driving force of said second motor to said third wrist portion; and
- a third power transmission means including a hollow reduction gear secured internally of said hollow shaft for transmitting a driving force of said third motor to said first wrist portion; and said power transmission shaft extends through said hollow reduction gear coaxially with said longitudinal axis of said robot arm.

* * * * *